(No Model.)

C. M. BLYDENBURGH.
HAMMER.

No. 559,049.  Patented Apr. 28, 1896.

WITNESSES
Chapman W. Fowler.
Edw. Fowler.

INVENTOR
Charles M. Blydenburgh,
by T. Walter Fowler,
his Attorney.

UNITED STATES PATENT OFFICE.

CHARLES M. BLYDENBURGH, OF RIVERHEAD, NEW YORK.

HAMMER.

SPECIFICATION forming part of Letters Patent No. 559,049, dated April 28, 1896.

Application filed November 29, 1895. Serial No. 570,545. (No model.)

*To all whom it may concern:*

Be it known that I, CHARLES M. BLYDENBURGH, a citizen of the United States, residing at Riverhead, in the county of Suffolk and State of New York, have invented certain new and useful Improvements in Hammers and Analogous Tools; and I do hereby declare the following to be a full, clear, and exact description of the invention, such as will enable others skilled in the art to which it appertains to make and use the same.

My invention relates to certain new and useful improvements in hammers and analogous tools; and it consists in a supplemental claw having a shank to be passed through the eye of the hammer and into the head of the handle, whereby said claw serves to supplement the action of the main claw by drawing nails, spikes, and other fastening devices which have been partially drawn by said main claw, and also serves as a means for securing the handle in said eye, thereby dispensing with wedges and other separate means for securing the handle fixedly to the hammer proper.

It also consists in the peculiar form of the supplemental claw and in the constructions and combinations of parts hereinafter fully described and claimed.

Figure 1:
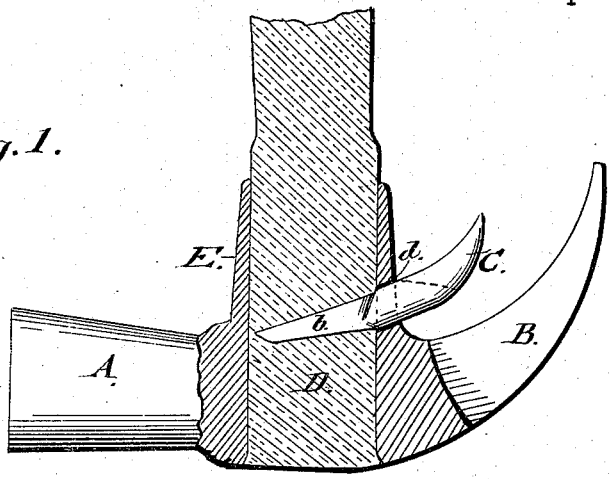
Figure 2:
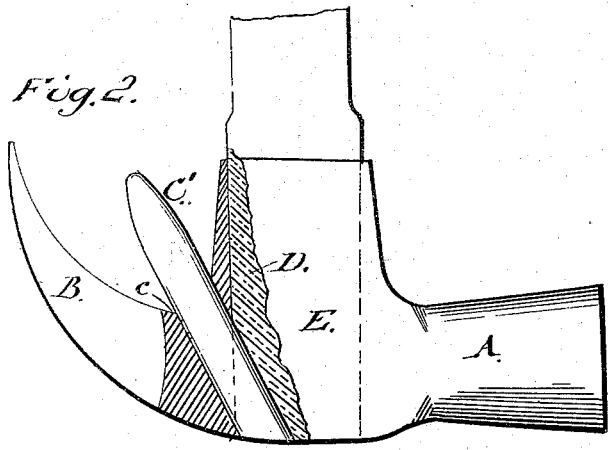
Figure 3:
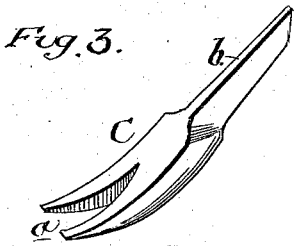

In the accompanying drawings, Figure 1 represents a side elevation, partially broken away, of a hammer with my improvement attached. Fig. 2 is a modification of Fig. 1. Fig. 3 is a detail of the supplemental claw.

In the drawings I have shown my present improvement as applied to a hammer A of well-known form, having a main claw B, although I do not limit the invention to this form only, but include any and all forms of analogous tools employing a claw for drawing nails, staples, and other fastening devices.

In addition to the main claw I employ a supplemental claw C, the essential purpose of which is to complete the drawing of a nail or other fastening which has been partially drawn by the action of the main claw. The preferred form of the claw is illustrated in Fig. 3. It consists of a bar or piece widened or thickened at one end and formed or provided with a claw $a$. Near the center the bar is gradually reduced and finally merges into a flattened shank $b$, the extremity of which may be slightly pointed to facilitate the insertion of the shank into the wood of the usual handle D.

In the form of device shown in Fig. 1 the eye E of the hammer is provided with an opening $d$ in the wall adjacent to the main claw, and that portion of the handle coincident with this opening is also preferably provided with an opening to receive the shank of the supplemental claw, which said shank is passed through the opening $d$ in the eye and forced or driven into the opening in the handle. This operation secures the shank in place and enables the claw end thereof to be maintained in such relation to the main claw that a nail, spike, or other fastening engaged and partially drawn by the main claw of the hammer may subsequently be engaged by the supplemental claw and fully drawn.

By flattening the shank the supplemental claw is prevented from turning when once seated, and by the shank being set on edge it is made to resist heavy strains, while not materially weakening the head of the handle, which might be the case if the shank was made of approximately uniform thickness throughout. If the point of the shank is sufficiently sharpened or pointed, it may be driven directly into the wood of the handle without necessitating the formation of a hole therein. In either case, however, the claw is firmly fastened to the hammer and in turn secures the handle in the eye so that it cannot be pulled out as long as the shank is in place. Neither can the supplemental claw turn axially or tilt while under the strain of pulling a nail or other device.

Being made separate and distinct from the hammer, it is evident that various sizes and forms of claws may be used in connection with a single hammer, if desired, and the supplemental claw may be applied to the hammers now in use by simply boring holes in the eyes of such hammers and driving the claw in place, as before described. This makes the present improvement more desirable than those in which a supplemental claw is formed as an integral part of the hammer. It is also less expensive than said integral structures, and should a claw become broken a new one may be substituted without difficulty and with but little expense. However, my supplemental claw is not liable to break, as it is firmly supported at all points, the thickened central portion, where the greatest strain occurs, being strongly supported by the wall of the opening through which the shank passes.

In the modified form shown in Fig. 2 the hole $c$ for the shank of the supplemental claw $C'$ is made at or about the junction of the main claw with the eye and is made at such an angle that it intersects the handle at or near the extremity of its head end and only passes into the handle for a short distance.

Having thus described my invention, what I claim as new, and desire to secure by Letters Patent, is—

1. In a hammer or analogous tool having a main claw and an eye to receive a handle, a supplemental claw the shank of which passes through an opening formed in one of the walls of said eye and into the handle whereby the claw is retained in place and the handle secured in the eye.

2. In a hammer or analogous tool having a main claw and an eye to receive a handle, said eye having a hole formed in one of its walls, a supplemental claw having a shank extending substantially in line therewith and adapted to be passed through said opening and into the portion of the handle inclosed by the eye whereby the claw is held in place and the handle secured in the eye.

3. In a hammer or analogous tool having a main claw and an eye to receive a handle, a means for securing the handle in said eye consisting of a piece passed through the eye and entering said handle, and having its outer end terminating in a claw said claw bearing such relation to the main claw that a nail or other fastening partially drawn by the main claw may be engaged by the other claw and fully drawn.

In testimony whereof I affix my signature in presence of two witnesses.

CHARLES M. BLYDENBURGH.

Witnesses:
　JOHN BAGSHAW,
　JAMES H. CORWIN.